United States Patent
Roberts et al.

(10) Patent No.: US 11,574,008 B2
(45) Date of Patent: *Feb. 7, 2023

(54) AUDIO IDENTIFICATION DURING PERFORMANCE

(71) Applicant: Gracenote, Inc., Emeryville, CA (US)

(72) Inventors: Dale T. Roberts, San Anselmo, CA (US); Bob Coover, Orinda, CA (US); Nicola Marcantonio, San Francisco, CA (US); Markus K. Cremer, Orinda, CA (US)

(73) Assignee: Gracenote, Inc., Emeryville, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/102,012

(22) Filed: Nov. 23, 2020

(65) Prior Publication Data

US 2021/0149954 A1 May 20, 2021

Related U.S. Application Data

(63) Continuation of application No. 15/888,998, filed on Feb. 5, 2018, now Pat. No. 10,846,334, which is a (Continued)

(51) Int. Cl.
*G06F 16/683* (2019.01)
*G06Q 50/00* (2012.01)
(Continued)

(52) U.S. Cl.
CPC ......... *G06F 16/683* (2019.01); *G06K 9/6219* (2013.01); *G06Q 50/01* (2013.01); *G10L 25/18* (2013.01); *G10L 25/51* (2013.01)

(58) Field of Classification Search
CPC .. G06K 9/00758; G06K 9/6219; G10L 25/18; G10L 25/51; G10L 25/45; G10H 2250/235
See application file for complete search history.

(56) References Cited

U.S. PATENT DOCUMENTS 5,040,081 A   8/1991  McCutchen
6,931,134 B1  8/2005  Waller, Jr. et al.
(Continued)

FOREIGN PATENT DOCUMENTS

WO    0227600    4/2002
WO    03091899   11/2003

OTHER PUBLICATIONS

Bisio, et al. "Fast audio fingerprint comparison for real-time TV-channel recognition applications", published by Wireless Communications and Mobile Computing Conference (IWCMC), 9th international. IEE, 2013, 6 pages.

(Continued)

*Primary Examiner* — Thomas H Maung
(74) *Attorney, Agent, or Firm* — McDonnell Boehnen Hulbert & Berghoff LLP

(57) ABSTRACT

Methods and apparatus for audio identification during a performance are disclosed herein. An example apparatus includes at least one memory and at least one processor to transform a segment of audio into a log-frequency spectrogram based on a constant Q transform using a logarithmic frequency resolution, transform the log-frequency spectrogram into a binary image, each pixel of the binary image corresponding to a time frame and frequency channel pair, each frequency channel representing a corresponding quarter tone frequency channel in a range from C3-C8, generate a matrix product of the binary image and a plurality of reference fingerprints, normalize the matrix product to form a similarity matrix, select an alignment of a line in the similarity matrix that intersects one or more bins in the similarity matrix with the largest calculated Hamming similarities, and select a reference fingerprint based on the alignment.

18 Claims, 10 Drawing Sheets

US 11,574,008 B2

Page 2

Related U.S. Application Data continuation of application No. 14/258,263, filed on Apr. 22, 2014, now abandoned.

(51) Int. Cl.
G10L 25/18 (2013.01)
G06K 9/62 (2022.01)
G10L 25/51 (2013.01)

(56) References Cited

U.S. PATENT DOCUMENTS

| | | | |
|---|---|---|---|
| 7,164,076 B2 | 1/2007 | McHale et al. | |
| 7,302,574 B2 | 11/2007 | Conwell et al. | |
| 8,180,063 B2 | 5/2012 | Henderson | |
| 9,153,239 B1* | 10/2015 | Postelnicu | G10L 25/18 |
| 10,846,334 B2 | 11/2020 | Roberts et al. | |
| 2004/0199387 A1 | 10/2004 | Wang et al. | |
| 2006/0074679 A1 | 4/2006 | Pifer et al. | |
| 2007/0188657 A1 | 8/2007 | Basson et al. | |
| 2008/0013614 A1 | 1/2008 | Fiesel et al. | |
| 2008/0065699 A1 | 3/2008 | Bloebaum et al. | |
| 2008/0082510 A1 | 4/2008 | Wang et al. | |
| 2008/0133556 A1 | 6/2008 | Conwell et al. | |
| 2008/0320078 A1 | 12/2008 | Feldman et al. | |
| 2011/0085781 A1 | 4/2011 | Olson | |
| 2011/0112913 A1 | 5/2011 | Murray | |
| 2011/0202687 A1 | 8/2011 | Glitsch et al. | |
| 2011/0273455 A1 | 11/2011 | Powar et al. | |
| 2011/0276333 A1 | 11/2011 | Wang et al. | |
| 2011/0289530 A1 | 11/2011 | Dureau et al. | |
| 2012/0059826 A1 | 3/2012 | Mate et al. | |
| 2012/0124638 A1 | 5/2012 | King et al. | |
| 2012/0209612 A1* | 8/2012 | Bilobrov | G10L 25/54 704/E11.001 |
| 2012/0210233 A1 | 8/2012 | Davis et al. | |
| 2013/0007201 A1 | 1/2013 | Jeffrey et al. | |
| 2013/0160038 A1 | 6/2013 | Slaney et al. | |
| 2013/0339877 A1 | 12/2013 | Skeen et al. | |
| 2014/0082651 A1 | 3/2014 | Sharifi | |
| 2014/0129571 A1 | 5/2014 | Scavo et al. | |
| 2014/0169768 A1 | 6/2014 | Webb et al. | |
| 2014/0254820 A1 | 9/2014 | Gardenfors et al. | |
| 2014/0324616 A1 | 10/2014 | Proietti et al. | |
| 2015/0016661 A1 | 1/2015 | Lord | |
| 2015/0104023 A1 | 4/2015 | Bilobrov | |
| 2015/0193701 A1 | 7/2015 | Sohn et al. | |
| 2015/0199974 A1* | 7/2015 | Bilobrov | G10L 25/51 700/94 |
| 2015/0206544 A1 | 7/2015 | Carter | |
| 2015/0302086 A1 | 10/2015 | Roberts et al. | |

OTHER PUBLICATIONS

Camarena-Ibarrola, et al., "Identifying music by performances using an entropy based audio-fingerprint", published by Mexican International Conference on Artificial intelligence (MICAI), 2006, 11 pages.

Camarena-Ibarrola, et al., "Real time tracking of musical performances", published by Advances in Soft Computing, 2010, 11 pages.

Collins, "Ubiquitous Electronics: Technology and Live Performance 1966-1996", published by Leonardo Music Journal, 1998, 6 pages.

Dixon, "Live tracking of musical performances using on-line time warping", proceedings of the 8th International Conference on Digital Audio Effects, 2005, 6 pages.

Fenet, et al., "A Scalable Audio Fingerprint Method with Robustness to Pitch-Shifting", ISMIR, 2001, 6 pages.

Grosche, et al., "Audio Content-Based Music Retrieval", Dagstuhl Follow-Ups, vol. 3, 2012, 18 pages.

Guzmán, et al, "On the Use of Locality Sensitive Hashing for Audio Following", Iberoamerican Congress on Pattern Recognition, Springer International Publishing, 2014, 2 pages.

Kennedy, et al., "Less talk, more rock: automated organization of community-contributed collections of concert videos", proceedings of the 18th International Conference on World Wide Web, ACM, 2009, 10 pages.

Miotto, et al., "Automatic identification of music works through audio matching", Research and Advanced Technology for Digital Libraries, 2007, 12 pages.

Park, et al., "Frequency filtering for a highly robust audio fingerprinting scheme In a real-noise environment", IEICE transactions on information and systems 89.7, 2006, 4 pages.

Rafii, et al., "An audio fingerprinting system for live version identification using image processing techniques", Acoustics, Speech and Signal Processing (ICASSP), 2014, IEEE International Conference on. IEEE, 5 pages.

Riley, et al., "A text retrieval approach to content-based audio retrieval", Int. Symp, on Music Information Retrieval (ISMIR), 2008, 6 pages.

Wang, "An Industrial Strength Audio Search Algorithm", ISMIR. Vol 2003, 7 pages.

Wang, et al., "Automatic Set List Identification and Song Segmentation for Full-Length Concert Videos", ISMIR, 2014, 6 pages.

Tachibana, "Audio watermarking for live performance", Electronic Imaging, 2003, International Society for Optics and Photonics, 2003, 12 pages.

"Cash-strapped music industry pins hope on festivals", published by CBS news, on Aug. 21, 2012, from http://www.cbsnews.com/8301-505263_162-57497067/cash-strapped-muslc-industry-pins-hope-on-festivals/, 2 pages.

"Who Says the Music Industry Is Kaput?", published by Bloomberg Businessweek Magazine, on May 27, 2010, from http://www.businessweek.com/magazine/content/10_23/b4181077568125.htm, 1 pages.

Grose, "Live, at a Field Near You: Why the Music Industry Is Singing a Happy Tune", published by Time, on Nov. 14, 2011, from http://content.time.com/time/printout/0,8816, 2098639,00.html, 4 pages.

Sisario, "Strong Earnings for Live Nation in Concert Season", published by The New York Times, on Aug. 6, 2013, from http://www.nytimes.com/2013/08/07/business/media/strong-earnings-for-live-nation-in-concert-season.html?_r=0, 2 pages.

United States Patent and Trademark Office, "Non-Final Office Action", issued in connection with U.S. Appl. No. 14/258,263, dated Jan. 15, 2016, 53 pages.

United States Patent and Trademark Office, "Final Office Action", issued In connection with U.S. Appl. No. 14/258,263, dated Aug. 12, 2016, 67 pages.

United States Patent and Trademark Office, "Non-Final Office Action", issued in connection with U.S. Appl. No. 14/258,263, dated Feb. 23, 2017, 69 pages.

United States Patent and Trademark Office, "Final Office Action", issued in connection with U.S. Appl. No. 14/258,263, dated Sep. 5, 2017, 87 pages.

United States Patent and Trademark Office, "Non-Final Office Action," issued in connection with U.S. Appl. No. 15/888,998, dated Mar. 20, 2020, 13 pages.

United States Patent and Trademark Office, "Notice of Allowance," issued in connection with U.S. Appl. No. 15/888,998, dated Jul. 23, 2020, 5 pages.

* cited by examiner

AUDIO IDENTIFICATION DURING PERFORMANCE

RELATED APPLICATIONS

This patent arises from a continuation of U.S. patent application Ser. No. 15/888,998, which was filed on Feb. 5, 2018, and is entitled "AUDIO IDENTIFICATION DURING PERFORMANCE", which is a continuation of U.S. patent application Ser. No. 14/258,263, which was filed on Apr. 22, 2014, and is entitled "AUDIO IDENTIFICATION DURING PERFORMANCE". U.S. patent application Ser. No. 14/258, 263 is hereby incorporated herein by reference in its entirety.

TECHNICAL FIELD

The subject matter disclosed herein generally relates to the processing of data. Specifically, the present disclosure addresses systems and methods to facilitate audio identification.

BACKGROUND

A performer may give a live performance (e.g., a concert or other live show) before an audience that includes one or more individuals (e.g., audience members, fans, or concertgoers). For example, a musical soloist (e.g., a singer-songwriter) may perform at a concert before such an audience. As another example, a musical group (e.g., a rock band) may perform at a concert before such an audience. As a further example, a theater troupe (e.g., including actors, dancers, and a choir) may perform a theatrical show before such an audience.

One or more audio pieces (e.g., musical pieces or spoken word pieces) may be performed during a live performance. For example, one or more songs may be performed, and a song may be performed with or without visual accompaniment (e.g., a video, a laser show, or a dance routine). In some situations, the performer of an audio piece is an artist that recorded the audio piece (e.g., as a studio recording or as a live recording). For example, a performer may perform a song that was written and recorded by her herself. In other situations, the performer of an audio piece is different from the artist that recorded the audio piece (e.g., as a studio recording or as a live recording). For example, a performer may perform a cover of a song that was written and recorded by someone else.

BRIEF DESCRIPTION OF THE DRAWINGS

Some embodiments are illustrated by way of example and not limitation in the figures of the accompanying drawings.

DETAILED DESCRIPTION

Figure 1:
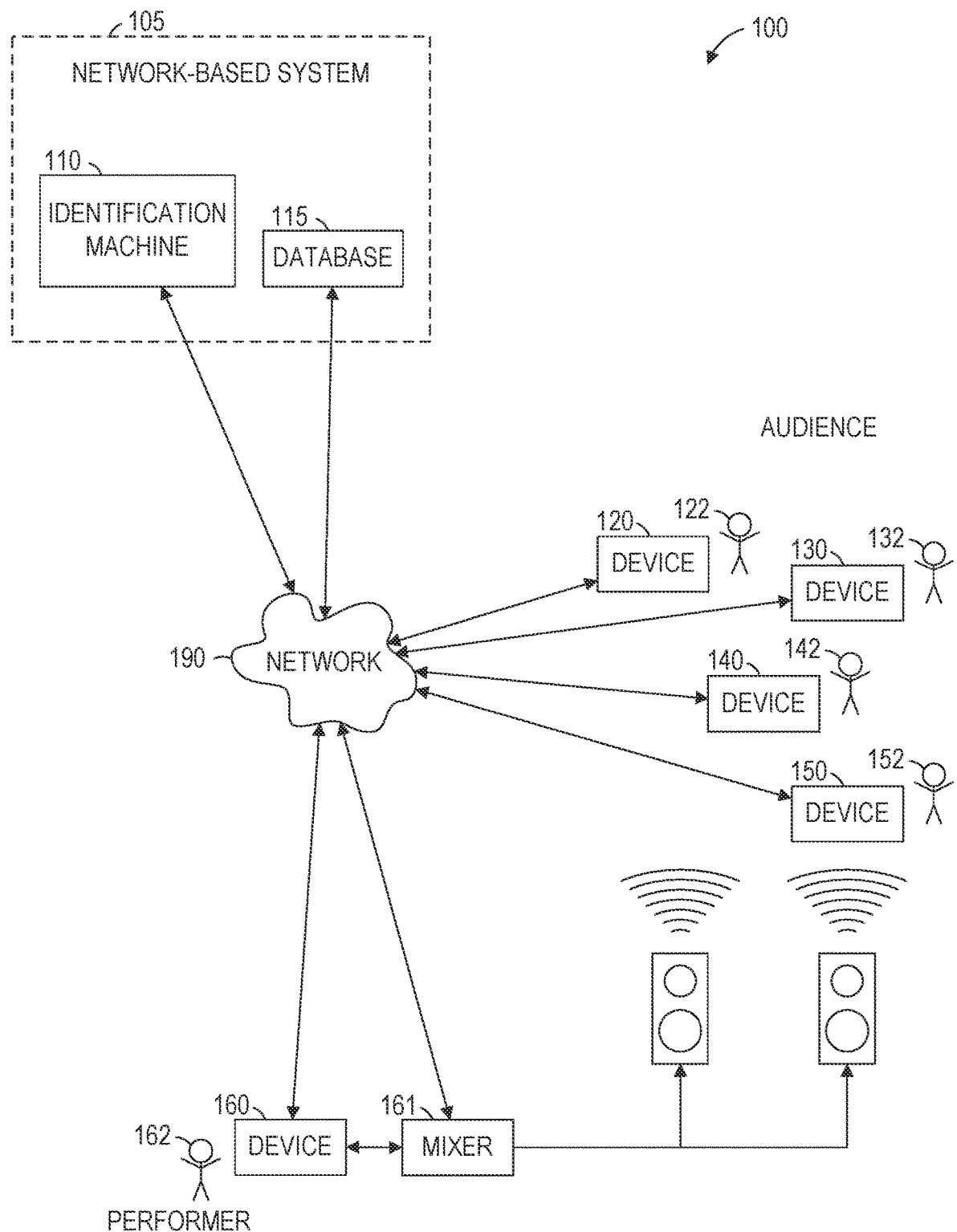
FIG. 1 is a network diagram illustrating a network environment suitable for audio identification, according to some example embodiments.

Example methods and systems are directed to audio identification. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

During a live performance (e.g., a live concert) of one or more audio pieces (e.g., songs), one or more audience members (e.g., concertgoers) may use a network-based system to identify an audio piece during its performance (e.g., while the audio piece is being performed). The network-based system may provide its users (e.g., the audience members) with one or more audio identification services. A machine may form all or part of the network-based system and may be configured (e.g., by software) to provide such identification services to one or more users (e.g., concertgoers).

The machine may be configured to obtain an identifier (e.g., a song name) of an audio piece during a performance of an audio piece (e.g., at a first time, such as five seconds into a song). The identifier may be obtained in any one or more of various ways, including, for example, receiving the identifier as a user submission (e.g., from an audience member, from a venue manager, or from the performer herself), inferring the identifier based on some received metadata of the audio piece (e.g., a partial name of the song, an album on which the song appears, or a release year of the song), inferring the identifier based on a detected geolocation of a device whose user is at the performance, tallying votes for the identifier (e.g., from several audience members), and accessing the identifier directly from a device of the performer (e.g., a mixer, a drum machine, a media player, a smartphone, or a tablet computer).

A user's device (e.g., smartphone or smart watch configured by a mobile app) may record a segment of the audio piece during its performance, generate a fingerprint of the segment, and upload the fingerprint to the machine. The machine may receive the fingerprint during the performance (e.g., at a second time, such as 15 seconds into the song) and assign the identifier to the fingerprint. This identifier may be provided to the user's device to identify the audio piece. The machine may receive additional information (e.g., one or more additional fingerprints or classifications of additional segments of the audio piece or other audio) from additional users' devices, and the machine may determine from this additional information that the audio piece has not ended (e.g., by failing to detect silence, applause, booing, or any suitable combination thereof). The machine may provide the identifier to any one or more of these additional users' devices.

According to some example embodiments, another user's device (e.g., configured by a mobile app) may record another segment of the audio piece during its performance, generate another fingerprint of the segment, and submit this fingerprint to the machine as a query for identification of the audio piece. While the performance continues, the machine may receive this fingerprint during the performance (e.g., at a third time, such as 30 seconds into the song) and respond during the performance by providing the identifier, which may be based on its determination that additional information (e.g., one or more additional fingerprints or classifications of additional segments of the audio piece or other audio) from additional user's devices fail to indicate an end of the audio piece.

According to various example embodiments, the machine may be configured to identify an audio piece, even when a live version (e.g., a live cover version) of the audio piece is being performed differently from a reference version (e.g., a studio version or radio version) of the audio piece as recorded by an artist (e.g., same or different from the performer of the live version). The machine may receive a live fingerprint of the segment of the live version (e.g., within a query for identification of the audio piece during its performance). The fingerprinting technique used here, in contrast to traditional fingerprinting techniques that identify the exact time and frequency positions of audio events, may instead identify one or more core characteristics of the audio piece (e.g., the notes and rhythms present) and be robust to differences between the live version and a reference version of the audio piece (e.g., differences in tempo, vocal timber, vocal strength, vibrato, instrument tuning, ambient noise, reverberation, or distortions). For example, the fingerprinting technique may be based on a chromagram that represents the harmonic structure of the live version (e.g., mapped to one octave). Such a fingerprinting technique may also be used later to identify and retrieve user-uploaded recordings from the performance (e.g., for copyright clearance purposes, to automatically tag or index such recordings, or any suitable combination thereof). The machine may identify the performer of the live version (e.g., by detecting a venue at which the live version is being performed and accessing information that correlates the detected venue with the performer).

The machine may then access a set of reference fingerprints that correspond to the artist that recorded the audio piece (e.g., based on the identified performer of the live version). For example, based on the identified performer (e.g., as well as a detected venue, a current date and time, or any suitable combination of), the machine may retrieve a list of audio pieces (e.g., a playlist, a concert program, or a concert brochure) that corresponds to the performer. Using the retrieved list, the machine may identify reference versions (e.g., official or canonical versions) of the audio pieces (e.g., recorded by the artist, who may be the same or different from the performer of the live version) and access reference fingerprints of the identified reference versions of the audio pieces. The reference fingerprints may have been previously generated from segments of the reference versions of the audio pieces, and among these reference fingerprints may be a reference fingerprint of the reference version of the audio piece whose live version is currently being performed.

Accordingly, the machine may compare the live fingerprint of a segment of the live version of an audio piece to the set of reference fingerprints of segments from the reference versions of the audio piece. In some example embodiments, the machine compares the live fingerprint exclusively (e.g., only) to the set of reference fingerprints. Based on this comparison, the machine may identify a match between the live fingerprint and the reference fingerprint and thus identify the audio piece while the audio piece is being performed. Thus, based on this comparison, the machine may provide an identifier of the audio piece in a response to the query for identification of the audio piece. The identifier may be provided during the performance of the live version of the audio piece.

FIG. 1 is a network diagram illustrating a network environment suitable for audio identification, according to some example embodiments. The network environment 100 includes an identification machine 110, a database 115, and devices 120, 130, 140, and 150 respectively being operated by users 122, 132, 142, and 152 in an audience, as well as a device 160 and a mixer 161 being operated by a performer 162. The identification machine 110, the database 115, the devices 120, 130, 140, 150, 160, and the mixer 161, may all be communicatively coupled (e.g., to each other) via a network 190. The identification machine 110, with or without the database 115, may form all or part of a network-based system 105 (e.g., a cloud-based server system configured to provide one or more audio identification services to the devices 120, 130, 140, and 150, to their respective users 122, 132, 142, and 152, or to any suitable combination thereof). The identification machine 110, the database 115, the devices 120, 130, 140, 150, and 160, and the mixer 161 may each be implemented in a computer system, in whole or in part, as described below with respect to FIG. 10.

Any one or more of the users 122, 132, 142, and 152 in the audience may be a human user (e.g., a human being), a machine user (e.g., a computer configured by a software program to interact with the device 120), or any suitable combination thereof (e.g., a human assisted by a machine or a machine supervised by a human). The user 122 is not part of the network environment 100, but is associated with the device 120 and may be a user of the device 120. For example, the device 120 may be a desktop computer, a vehicle computer, a tablet computer, a navigational device, a portable media device, a smartphone, or a wearable device (e.g., a smart watch or smart glasses) belonging to the user 122. Similarly, the user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132.

Likewise, the user 142 is not part of the network environment 100, but is associated with the device 140. As an example, the device 140 may be a desktop computer, a vehicle computer, a tablet computer, a navigational device, a portable media device, a smartphone, or a wearable device (e.g., a smart watch or smart glasses) belonging to the user 142. Moreover, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152. Furthermore, the performer 162 is not part of the network environment 100, but is associated with the device 160 and the mixer 161. As an example, the device 160 may be a desktop computer, a vehicle computer, a tablet computer, a navigational device, a portable media device, a smartphone, or a wearable device (e.g., a smart watch or smart glasses) belonging to the performer 162.

The mixer 161 may be or include an audio playback device, an audio mixing device, an audio processing device, or any suitable combination thereof. According to various example embodiments, the mixer 161 may drive (e.g., output signals that represent audio information to) one or more amplifiers, speakers, or other audio output equipment in producing sound for the audience during a performance of an audio piece by the performer 162. In some example embodiments, the mixer 161 is a source of one or more segments of a reference version of an audio piece (e.g., an audio piece to be identified later during performance of the audio piece). In certain example embodiments, the mixer 161 may perform operations described herein for any one or more of the devices 120, 130, 140, and 150.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the identification machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
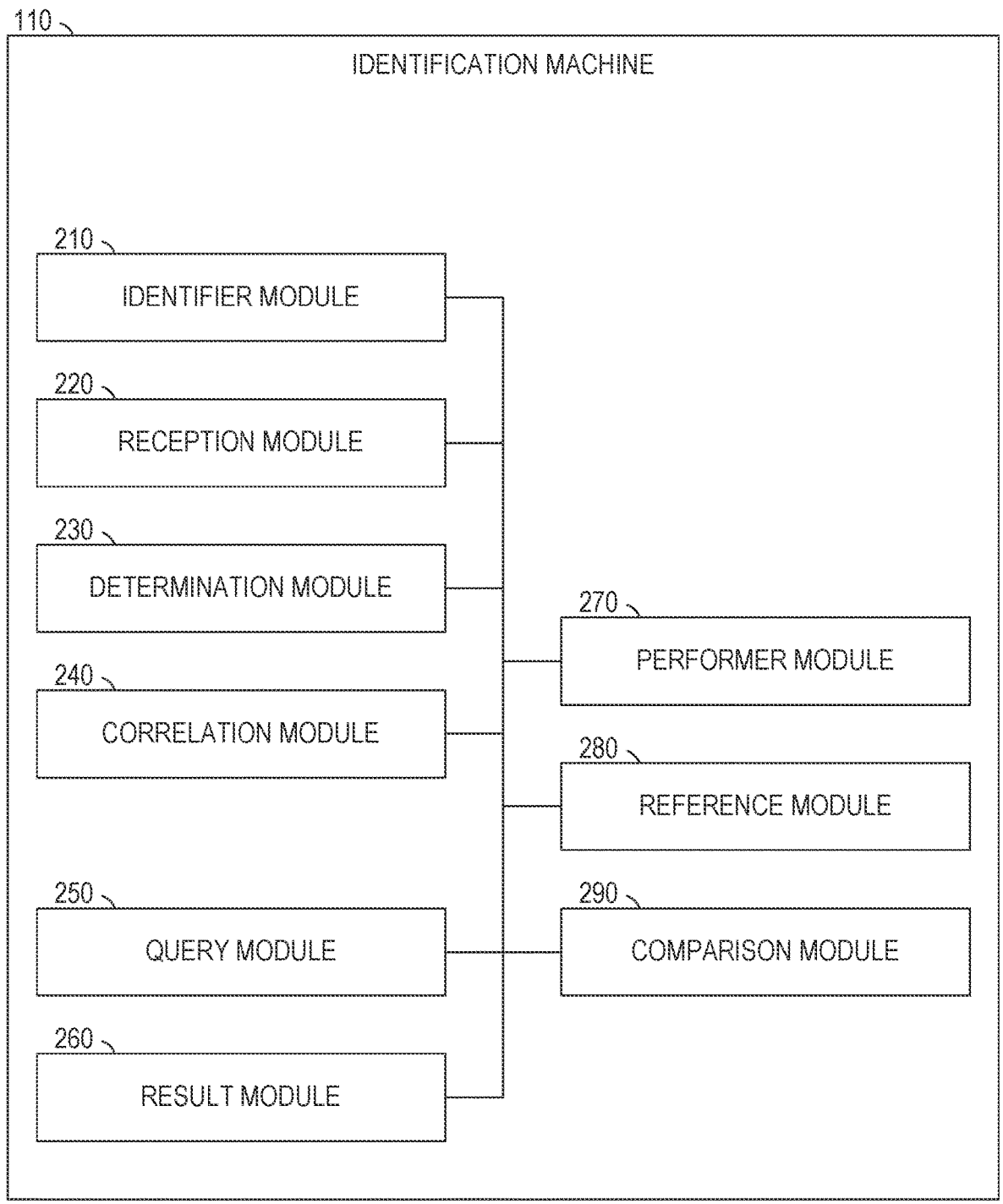
FIG. 2 is a block diagram illustrating components of an identification machine suitable for audio identification, according to some example embodiments.

FIG. 2 is a block diagram illustrating components of the identification machine 110, according to some example embodiments. The identification machine 110 is shown as including an identifier module 210, a reception module 220, a determination module 230, a correlation module 240, the query module 250, a result module 260, a performer module 270, a reference module 280, and a comparison module 290, all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
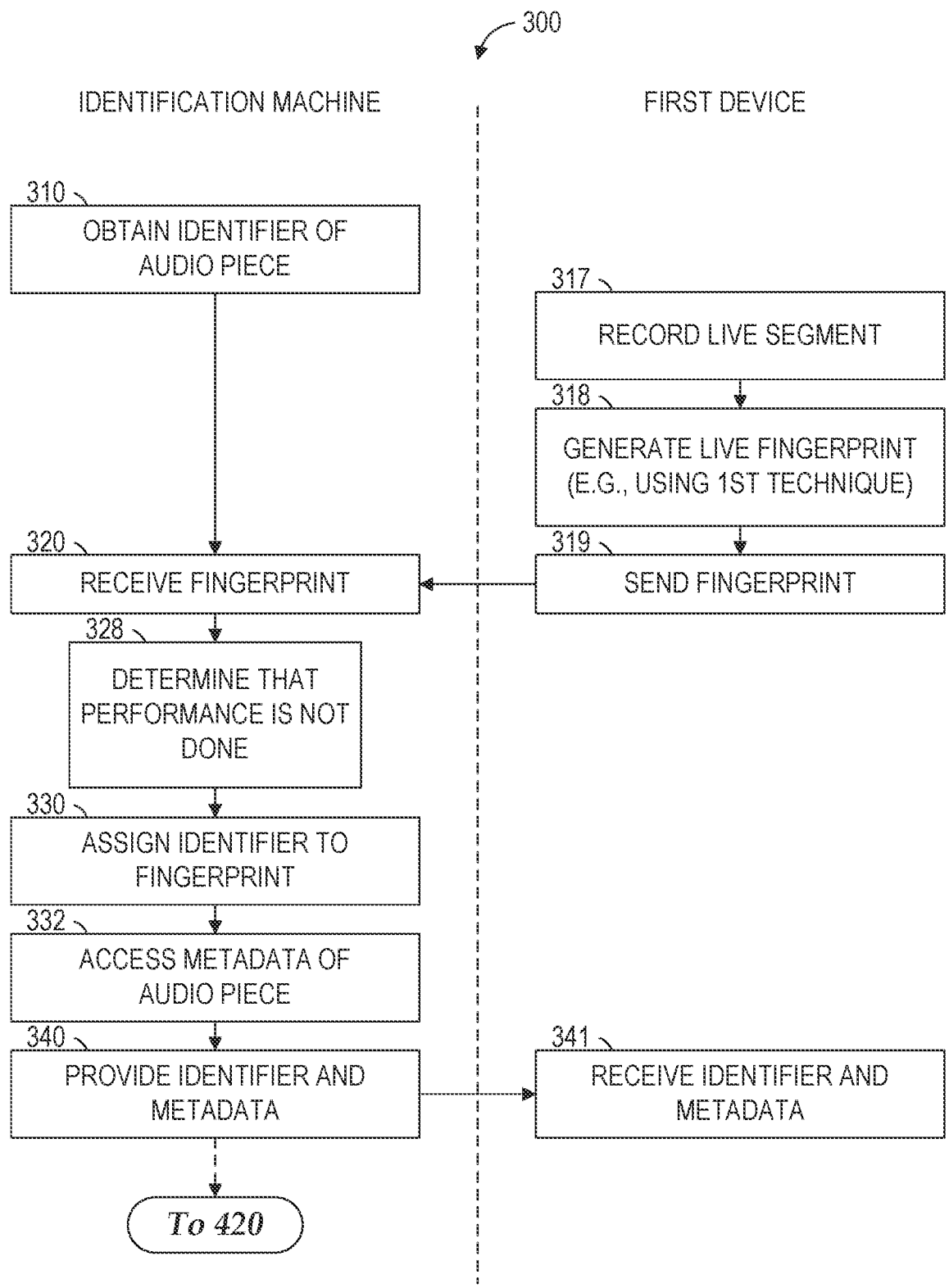
FIGS. 3-9 are flowcharts illustrating operations in a method of audio identification, according to some example embodiments.

FIGS. 3-9 are flowcharts illustrating operations in a method 300 of audio identification (e.g., of an audio piece during a live performance of the audio piece), according to some example embodiments. FIG. 3 illustrates some interactions between the identification machine 110 and the device 120 (e.g., a first device) during a performance of the audio piece by the performer 162. These illustrated interactions may form a portion of the method 300, according to various example embodiments, or may form a separate method in its entirety, according to alternative example embodiments.

Operation 310 may be performed at or near the beginning of the performance (e.g., at a first time, such as five or ten seconds into the performance) of the audio piece. In operation 310, the identifier module 210 of the identification machine 110 obtains an identifier of the audio piece. The identifier may be a title of the audio piece (e.g., a song name). As discussed below with respect to FIG. 6, the identifier may be obtained in any of several ways.

In operation 317, the device 120 (e.g., the first device) records a live segment of the audio piece being performed. For example, the live segment may be recorded by a microphone built into the device 120. According to various example embodiments, operation 370 may be performed at any point during the performance of the audio piece.

In operation 318, the device 120 generates a live fingerprint of the live segment recorded in operation 317. For example, the device 120 may apply one or more audio fingerprinting techniques (e.g., algorithms) to generate the live fingerprint. In some example embodiments, the audio fingerprinting technique (e.g., a first technique) used by the device 120 in operation 318 is designated or selected (e.g., by the identification machine 110) as a default technique and may be designated or selected based on the presence or absence of processing power, available memory, or both, in the device 120.

In operation 319, the device 120 communicates (e.g., sends) the generated live fingerprint to the identification machine 110 (e.g., via the network 190). In corresponding operation 320, the reception module 220 of the identification machine 110 accesses (e.g., receives) the generated live fingerprint communicated by the device 120 (e.g., at a second time, such as 15 or 20 seconds into the performance).

According to certain example embodiments, operations 317-319 are performed by the device 160 of the performer 162, or by the mixer 161. Thus, in operation 320, the reception module 220 of the identification machine 110 may access the generated live fingerprint as communicated by the device 160, or by the mixer 161 (e.g., at the second time). In some cases, the audio piece includes multiple audio channels (e.g., 64 separate audio channels being input into the mixer 161, including a monophonic audio channel for a lead guitar, a monophonic audio channel for a bass guitar, left and right stereo audio channels for a synthesizer keyboard, and eight monophonic microphone channels for a drum kit). According to various example embodiments, the entire mix of these multiple channels is used for generating the live fingerprint in operation 318. In some example embodiments, the generating of the live fingerprint in operation 318 may be based on less than all of these multiple audio channels (e.g., generated from a subset of the multiple audio channels). For example, the live fingerprint may be generated exclusively from a monophonic audio channel for lead guitar.

Some example embodiments of the method 300 include operation 328. In operation 328, the determination module 230 of the identification machine 110 determines that the performance has not yet been completed (e.g., has not finished or is not yet done). As discussed below with respect to FIG. 7, this determination may be made by determining that one or more live fingerprints of segments of the audio piece being performed fail to indicate an end of the audio piece, an end of the performance of the audio piece, or both. Since the performance is not completed, the determination module 230 may determine that the respective times at which the identifier of the audio piece and the live fingerprint were accessed (e.g., the first time and the second time) occurred during the performance of the audio piece.

In operation 330, the correlation module 240 of the identification machine 110 assigns the identifier obtained in operation 310 to the live fingerprint received in operation 320. This may be based on the determination in operation 328 that the performance is not over. Accordingly, the correlation module 240 may assign the identifier to the live fingerprint based on an inference that the performance of the audio piece is still ongoing (e.g., continuing).

In operation 332, the query module 250 of the identification machine 110 accesses metadata of the audio piece (e.g., from the database 115). For example, the query module 250 may generate a query based on (e.g., inclusive of) the identifier assigned to the live fingerprint in operation 330. In some example embodiments, the query is generated based on the determination in operation 328 the performance is not finished. The query module 250 may submit the generated query to the database 115, and in response, the database 115 may provide the query module 250 with the metadata of the audio piece or access thereto.

In operation 340, the result module 260 of the identification machine 110 provides the identifier and some or all of the metadata to the device 120 (e.g., via the network 190), during the performance of the audio piece. For example, the result module 260 may communicate all or part of the identifier obtained in operation 310 and all or part of the metadata accessed in operation 332 to the device 120 (e.g., for presentation thereon, in whole or in part, to the user 122). In corresponding operation 341, the device 120 accesses (e.g., receives) the information that was communicated (e.g., via the network 190) from the result module 260 in operation 340.

Figure 4:
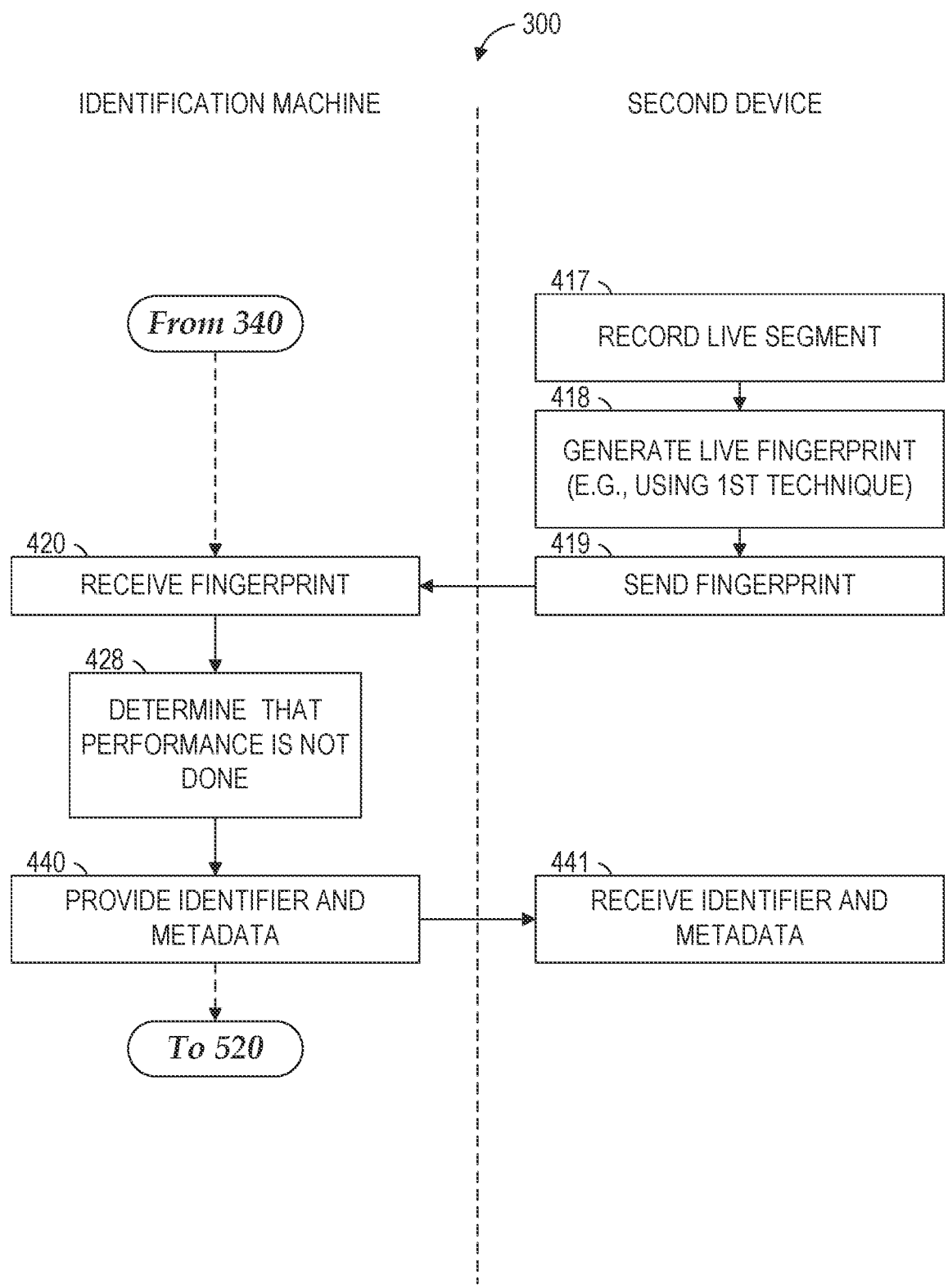

FIG. 4 illustrates some interactions between identification machine 110 and the device 130 (e.g., a second device) during the same performance of the audio piece by the performer 162. These illustrated interactions may form a portion of the method 300, according to various example embodiments, or may form a separate method in its entirety, according to alternative example embodiments.

In operation 417, the device 130 (e.g., the second device) records a live segment of the audio piece being performed. For example, the live segment may be recorded by a microphone built into the device 130.

In operation 418, the device 130 generates a live fingerprint of the live segment recorded in operation 417. For example, the device 130 may apply one or more audio fingerprinting techniques to generate the live fingerprint. In some example embodiments, the audio fingerprinting technique (e.g., a first technique) to be used by the device 130 in operation 418 has been designated or selected (e.g., by the identification machine 110) as a default technique and may be so designated or selected based on the presence or absence of processing power, available memory, or both, in the device 130. However, in alternative example embodiments, the audio fingerprinting technique (e.g., a second technique) to be used by the device 140 in operation 518 is a different (e.g., non-default) technique and may be so designated or selected based on the presence or absence of processing power, available memory, or both, in the device 140.

In some cases, the audio piece includes multiple audio channels (e.g., 64 separate audio channels, including a monophonic audio channel for a lead guitar, a monophonic audio channel for a bass guitar, left and right stereo audio channels for a synthesizer keyboard, and eight monophonic microphone channels for a drum kit). In some example embodiments, the generating of the live fingerprint in operation 418 may be based on less than all of these multiple audio channels (e.g., generated from a subset of the multiple audio channels). For example, the live fingerprint may be generated exclusively from a monophonic audio channel for lead guitar. As another example, the live fingerprint may be generated exclusively from a monophonic vocal track (e.g., using vocal melody and lyrics for generating the live fingerprint). According to various example embodiments, the live fingerprint is generated from one or more audio channels that are dominant throughout the audio piece, which may facilitate reliable and consistent identification of the audio piece.

In operation 419, the device 130 communicates the generated live fingerprint to the identification machine 110 (e.g., via the network 190). The live fingerprint may be communicated in a query for identification of the audio piece, and such a query may be submitted from the device 130 to the network-based system 105 during the performance of the audio piece. In corresponding operation 420, the reception module 220 of the identification machine 110 accesses the generated live fingerprint communicated by the device 130 (e.g., at a third time, such as 30 or 35 seconds into the performance).

In operation 428, the determination module 230 of the identification machine 110 determines that the performance is not done (e.g., not yet ended, completed, finished, or over). As discussed in greater detail below with respect to FIG. 7, this determination may be made by determining that one or more live fingerprints of segments of the audio piece being performed fail to indicate an end of the audio piece, an end of the performance of the audio piece, or both.

In operation 440, the result module 260 of the identification machine 110 provides the identifier (e.g., assigned in operation 330) and some or all of the metadata to the device 130 (e.g., via the network 190). For example, the result module 260 may communicate all or part of the identifier obtained in operation 310 and all or part of the metadata accessed in operation 332 to the device 130 (e.g., for presentation thereon, in whole or in part, to the user 132). In corresponding operation 441, the device 130 accesses the information that was communicated from the result module 260 in operation 340. This may have the effect of providing the identifier of the audio piece in a response to the query for identification of the audio piece, during the performance of the audio piece. According to various example embodiments, the identifier may be accompanied by additional information (e.g., metadata of the audio piece). Such additional information may include lyrics, album art, original release year, original composer, other performers of the audio piece, or other metadata of the audio piece, as well as an offer to sell a recording (e.g., original or non-original) of the audio piece.

In some example embodiments, the identifier may be accompanied by an authorization, such as an authorization to access backstage passes or a merchandise offer (e.g., for free or discounted merchandise related to the audio piece, to the performer, or to both). In various example embodiments, the authorization enables software (e.g., an application, an applet, or a mobile app) executing on the device 130 to access special content that may be presented on the device 130 (e.g., on a screen of the device 130). Examples of such special content include screen lighting or imagery (e.g., a slideshow or background image), a game (e.g., a single-player or multiplayer quiz or treasure hunt), or any suitable combination thereof. For example, a game may challenge the user 132 to win a prize (e.g., an album on compact disc (CD) or as a music download, exclusive video footage, a t-shirt, or other merchandise item) by correctly identifying multiple audio pieces performed by the performer 162 or by being the first to correctly identify all songs released on a specific album.

Figure 5:
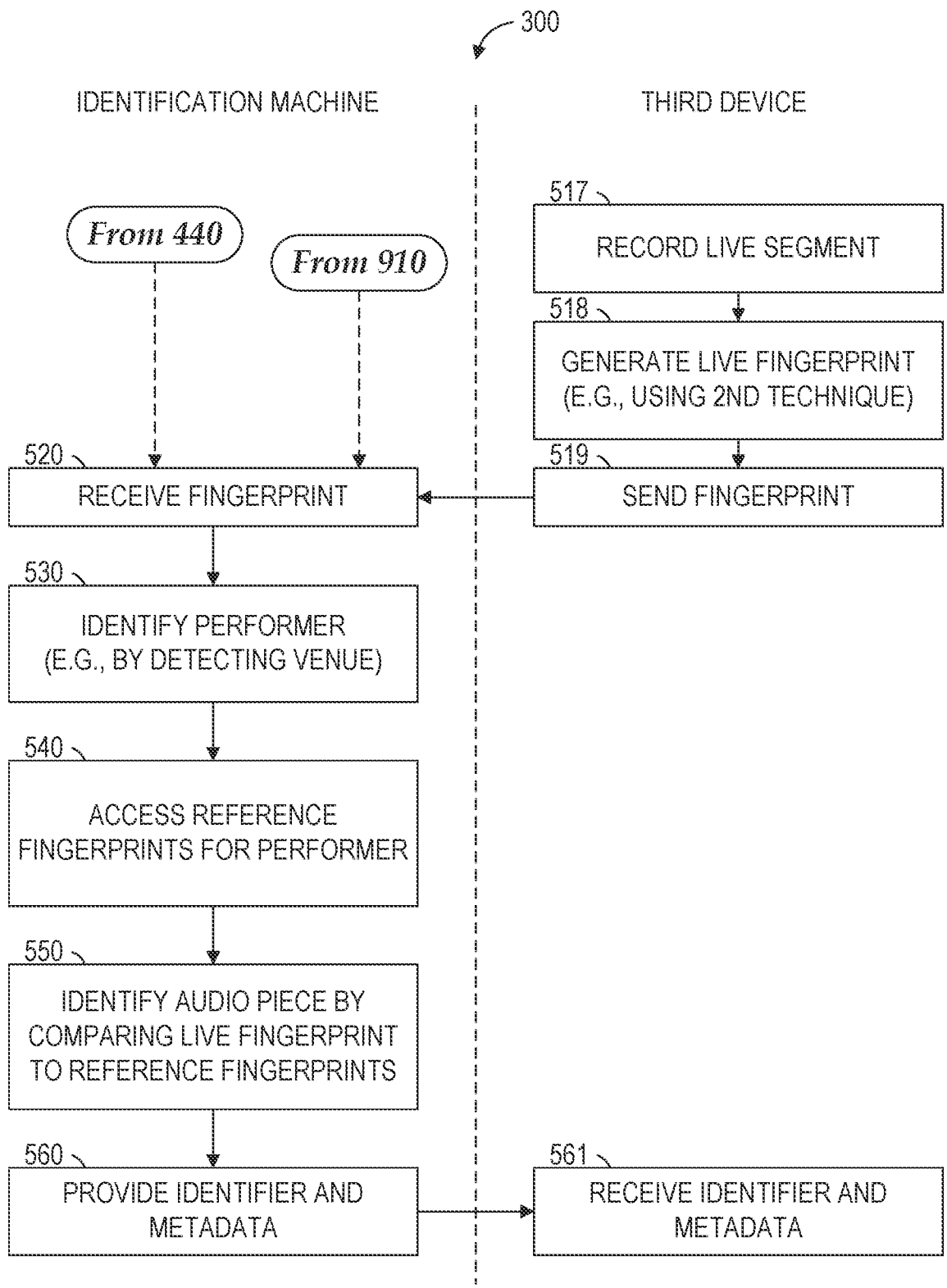

FIG. 5 illustrates some interactions between the identification machine 110 and the device 140 (e.g., a third device) during a live performance of an audio piece by the performer 162. In some example embodiments, the live performance is the same performance discussed above with respect to FIGS. 3-4. In certain example embodiments, the performer 162 is performing a live version (e.g., a live cover version) of an audio piece differently from a reference version (e.g., a studio version or radio version) of the audio piece as recorded by an artist who may be the same or different from the performer 162 of the live version. These illustrated interactions may form a portion of the method 300, according to various example embodiments, or may form a separate method in its entirety, according to alternative example embodiments. For example, in some example embodiments, the identification machine 110 performs only operations 520, 530, 540, 550, and 560 (e.g., in response to performance of operations 517, 518, and 519 by the device 140), without performing any operations described above with respect to FIGS. 3 and 4.

In operation 517, the device 140 (e.g., the third device) records a live segment of the audio piece being performed. For example, the live segment may be recorded by a microphone built into the device 140. In particular, the device 140 may record a live segment of a live version (e.g., a live cover version) of the audio piece, as the live version of the audio piece is being performed. As another example, the live segment may be received (e.g., as a digital feed, a network stream, a broadcast signal, or any suitable combination thereof) by the device 140 via the network 190 (e.g., from the identification machine 110, the device 160, or the mixer 161).

In operation 518, the device 140 generates a live fingerprint of the live segment recorded in operation 517. For example, the device 140 may apply one or more audio fingerprinting techniques to generate the live fingerprint. In some example embodiments, the audio fingerprinting technique (e.g., a first technique) to be used by the device 140 in operation 518 is designated or selected (e.g., by the identification machine 110) as a default technique and may be so designated or selected based on the presence or absence of processing power, available memory, or both, in the device 140. However, in alternative example embodiments, the audio fingerprinting technique (e.g., a second technique) to be used by the device 140 in operation 518 is a different (e.g., non-default) technique and may be so designated or selected based on the presence or absence of processing power, available memory, or both, in the device 140. In some example embodiments, the audio fingerprinting technique (e.g., the second technique) is particularly suitable for live version identification and may implement one or more image processing techniques to derive fingerprints that are robust to both audio degradations and audio variations, while still being compact enough for efficient matching. Further details on such an audio fingerprinting technique are provided below.

In operation 519, the device 140 communicates the generated live fingerprint to the identification machine 110 (e.g., via the network 190). The live fingerprint may be communicated in a query for identification of the audio piece, and such a query may be submitted from the device 140 to the network-based system 105 during the performance of the audio piece (e.g., the live version of the audio piece). In corresponding operation 520, the reception module 220 of the identification machine 110 accesses the generated live fingerprint communicated by the device 140 (e.g., at any point in time during the performance of the audio piece, such as 5, 10, 15, 20, 30, 40, or 45 seconds into the performance).

In operation 530, the performer module 270 of the identification machine 110 identifies the performer of the live version of the audio piece. For example, the performer module 270 may detect the venue of the live performance (e.g., the place or location where the live performance is occurring) and identify the performer based on the detected venue (e.g., by accessing information, which may be stored in the database 115, that correlates the performer with the venue). For example, the detected venue may be a concert hall, an auditorium, a hotel, a conference room, a resort, a school, a theater, an amphitheater, a fairground, a sports arena, a stadium, a private residence, or any suitable combination thereof. As discussed below with respect to FIG. 8, the detection of the venue may be based on a geolocation (e.g., Global Positioning System (GPS) coordinates) of the device 140, an identifier (e.g., Internet protocol (IP) address) of a network (e.g., network 190) at the venue (e.g., a local wireless network at the venue), an image (e.g., photo) of a ticket stub for an event that includes the live performance (e.g., generated by the device 140 and accessed by the performer module 270), a user preference for the venue (e.g., stored in a user profile of the user 142), social network data that references the venue (e.g., publicly or privately published in a microblog entry by the user 142), a calendar event of the user 142, a purchase record of the user 142 (e.g., for tickets to an event that includes live performance), or any suitable combination thereof. In further example embodiments, the venue may be detected by detecting that the device 140 is executing a special application that corresponds to the venue, is accessing a specific uniform resource locator (URL) that corresponds the venue, or any suitable combination thereof.

In operation 540, the reference module 280 of the identification machine 110 accesses a set of one or more reference fingerprints based on the performer identified in operation 530. Furthermore, the accessing of the reference fingerprints may be also based on the detected venue at which the live version is being performed, a current date, current time, or any suitable combination thereof. As noted above, the reference module 280 may retrieve a list of audio pieces (e.g., playlist, concert program, a concert brochure, or concert poster) for the performer (e.g., based on the detected venue and at the current date and current time). Based on this retrieved list, the reference module 280 may identify reference versions (e.g., official or canonical versions) of the audio pieces that correspond to the performer (e.g., and corresponding to the detected venue, the current date, the current time, or any suitable combination thereof). The database 115 may store these reference fingerprints, which may have been previously generated from segments of the reference versions of the audio pieces. Among these reference fingerprints may be a reference fingerprint (e.g., a particular reference fingerprint) of a reference version of the audio piece of which a live version is currently being performed. The set of reference fingerprints may be accessed from the database 115, which may correlate (e.g., assign, map, or link) the reference fingerprint (e.g., the particular reference fingerprint) of the reference version with the identifier of the audio piece (e.g., as assigned in operation 330). According to various example embodiments, operation 540 may be performed at any point prior to operation 550 (e.g., before the performance of the audio piece). In example embodiments, in which operation 540 is performed prior to the beginning of the performance, the accessing of the reference fingerprints may be based on a scheduled date and time for the performance itself.

In operation 550, the comparison module 290 of the identification machine 110 identifies the audio piece being performed by comparing the live fingerprint (e.g., accessed in operation 520) to the set of reference fingerprints (e.g., accessed in operation 540). In other words, the comparison module 290 may compare the live fingerprint of a segment of the live version to the reference fingerprints of segments of the reference versions. In some example embodiments, the comparison module 290 compares the live fingerprint exclusively (e.g., only) to the set of reference fingerprints or a subset thereof. This may have the effect of reducing computational complexity, increasing computational speed, increasing accuracy, or any suitable combination thereof. Based on this comparison, the comparison module 290 may identify a match between the live fingerprint and the reference fingerprint (e.g., the particular reference fingerprint) of the reference version of the audio piece of which the live version is currently being performed. Based on this identifying of the match, the comparison module 290 may identify the audio piece while its live version is being performed. In some example embodiments, the identified match between the live fingerprint and the reference fingerprint may be an imperfect match (e.g., a fuzzy match or a near match).

According to various example embodiments, operation 550 includes performing an analysis of musically meaningful and unique features audio piece, and then performing a loose comparison that allows for differences in the playing and interpretation of the audio piece (e.g., different instrumentation, tempo, or intonation). In some example embodiments, operation 550 includes determines harmonic and rhythmic elements from the live fingerprint and the set of reference fingerprints and compares these elements to find a most likely candidate match among the set of reference fingerprints. Such an analysis and comparison may be performed within a predetermined period of time (e.g., a 10 second window). In some situations, the analysis and comparison are performed in short segments (e.g., 3 second segments). The analysis and comparison may be performed until a single match (e.g., best candidate) is found, or until the analysis and comparison converge to obtain a stabilized list of a few candidate matches. For example, multiple candidate matches maybe identified in situations where the set of reference fingerprints includes reference fingerprints from multiple different recordings of the audio piece (e.g., studio recordings, live recordings, and variations, such as acoustic versions or extended remixes).

In operation 560, the result module 260 of the identification machine 110 provides the identifier (e.g., as assigned in operation 330) of the identified audio piece to the device 140 (e.g., by the network 190). The identifier may be provided with some or all of the metadata for the audio piece. For example, the result module 260 may communicate all or part of the identifier obtained in operation 310 and all or part of the metadata accessed in operation 332 to the device 140 (e.g., for presentation thereon, in whole or in part, to the user 142). In corresponding operation 561, the device 140 accesses the information that was communicated from the result module 260 in operation 560. This may have the effect of providing the identifier of the audio piece in a response to the query for identification of the audio piece, during the performance of the live version of the audio piece. In example embodiments where the identified match between the live fingerprint and the reference fingerprint is an imperfect match (e.g., fuzzy match), the identifier may be provided as a candidate identifier (e.g., a proposed identifier) among multiple candidate identifiers (e.g., for confirmation by the user 142 via the device 140). For example, a candidate identifier may be provided as part of a game (e.g., a trivia quiz) in which multiple users (e.g., users 132, 142, and 152) attempt to identify the audio piece by selecting the correct candidate identifier from among multiple candidate identifiers presented.

As mentioned above, the audio fingerprinting technique used (e.g., by the device 140) for identifying the live version of the audio piece may be particularly well-suited for generating fingerprints that are robust to both audio degradations and audio variations, while still being compact enough for efficient matching. Such a fingerprint may be derived from a segment of an audio piece (e.g., a live segment or a reference segment) by first using a log-frequency spectrogram to capture the melodic similarity and handle key variations, and then using adaptive thresholding to reduce the feature size and handle noise degradations and local variations.

First, the segment to be transformed into a time-frequency representation, such as a log-frequency spectrogram based on the Constant Q Transform (CQT). The CQT is a transform with a logarithmic frequency resolution, similar to the human auditory system and consistent with the notes of the Western music scale. Accordingly, the CQT may be well-suited for music analysis. The CQT may handle key variations relatively easily, since pitch deviations correspond to frequency translations in the transform. According to certain example embodiments, the CQT is computed by using a fast algorithm based on the Fast Fourier Transform (FFT) in conjunction with the use of a kernel. Thus, a CQT-based spectrogram may be derived by using a time resolution of around 0.13 seconds per time frame and the frequency resolution up one quarter note per frequency channel, with a frequency range spanning from C3 (130.81 Hz) to C8 (4186.01 Hz), resulting in 120 frequency channels.

Next, the CQT-based spectrogram may be transformed into a binary image. According to various example embodiments, this is performed using adaptive thresholding method based on two-dimensional median filtering. Thresholding is a technique for image segmentation that uses a threshold value to turn a grayscale image into a binary image. In adaptive thresholding, the threshold value for each pixel of an image may be adapted based on local statistics of the pixel's neighborhood. For each time-frequency bin in the CQT-based spectrogram, given a window size, the median of the neighborhood may be computed. As an example, the window size may be 35 frequency channels by 15 time frames. Then, the value of the bin may be compared with the value of its median. If the value of the bin is higher than its median, the value of the bin may be assigned to 1. If otherwise, the value of the bin may be assigned to 0. This process may be restated as the following equation:

$$\forall\, (i, j),\ M(i, j) = \operatorname*{median}_{\substack{i-\Delta_i \le I \le i+\Delta_i \\ j-\Delta_j \le J \le j+\Delta_j}} X(I, J)$$

$$\forall\, (i, j),\ B(i, j) = \begin{cases} 1 & \text{if } (X, i, j) > M(i, j) \\ 0 & \text{otherwise} \end{cases}$$

Accordingly, the CQT-based spectrogram may be clustered into foreground (e.g., with assigned values of one) where the energy is locally high, or background (e.g., with assigned values of zero) with the energy is locally low. The result may therefore be used as a compact fingerprint (e.g., a CQT-based fingerprint) that can handle noise degradations while still allowing local variations.

Such compact (e.g., CQT-based) fingerprints may be used to perform comparisons and matching between a query fingerprint and one or more reference fingerprints. As an example, template matching may be performed (e.g., by the comparison module 290 during operation 550) between query and reference fingerprints by first using Hamming similarity to compare all pairs of time frames at different pitch shifts and handle key variations, and then using the Hough Transform to find the best alignment and handle tempo variations.

First, a similarity matrix may be computed between a query fingerprint and a reference fingerprint. As noted above, Hamming similarity may be calculated between all pairs of time frames in the query fingerprint and the reference fingerprints. The Hamming similarity is the percentage of pins that matches between two arrays (e.g., arrays of ones and zeroes). In some example embodiments, the query and reference fingerprints are converted according to the function $f(x)=2x-1$. Then, the matrix product of the query and reference fingerprints may be computed. This matrix product may then be converted according to the function $f^{-1}(x)=(x+1)/2$, and each value may be normalized by the number of frequency channels in one fingerprint. Each bin in the resulting matrix then measures the Hamming similarity between any two pairs of time frames in the query and reference fingerprints. The similarity matrix for different pitch shifts in the query may also be computed. In some cases, a number of ±10 pitch shifts may be used (e.g., assuming a maximum key variation of ±5 semitones between a live performance and its studio version). This may have the effect of measuring the similarity of both the foregrounds and the backgrounds between the query and reference fingerprints, which may be beneficial in identifying an audio piece.

Next, the best alignment between the query fingerprint and the reference fingerprint may be identified. For example, the best alignment may correspond to a line that is at or near an angle of 45° in the similarity matrix and that intersects the bins with the largest calculated Hamming similarity. Such a line may be parametrically represented as as $\rho = x \cos\theta + y \sin\theta$. As noted above, the Hough Transform may be used to determine the best alignment. The Hough Transform is a technique for detecting shapes (e.g., lines) in an image by building a parameter space matrix and identifying the parameter candidates that give the largest values. In some example embodiments, the similarity matrix computed above may be binarized based on a threshold value. The Hough Transform may then be computed, and the $(\rho, \theta)$ candidate that gives the largest normalized value in the space parameter matrix may be identified (e.g., as the highest overall Hamming similarity). As examples, the threshold value may be 0.6; a range for $\rho$ may be equal to the number of time frames in the reference fingerprints; and a range for $\theta$ may be around −45°±5°, which may correspond to a number of ±10 time shifts (e.g., assuming a maximum tempo variation of ±20% between a live performance and its studio version). This may have the effect of identifying a short and noisy excerpt (e.g., recorded from a smartphone at a live performance) by comparing the excerpt to a database of studio recordings from a known performer or known artist. According to certain example embodiments, no hash functions are used in the above fingerprinting and matching techniques. This may have the effect of obtaining greater accuracy. In situations with relatively short queries (e.g., segments of audio less than 10 seconds in duration) and relatively small databases (e.g., 50-100 songs per artist or performer), the lack of hash functions may provide such increased accuracy without sacrificing system performance.

Figure 6:
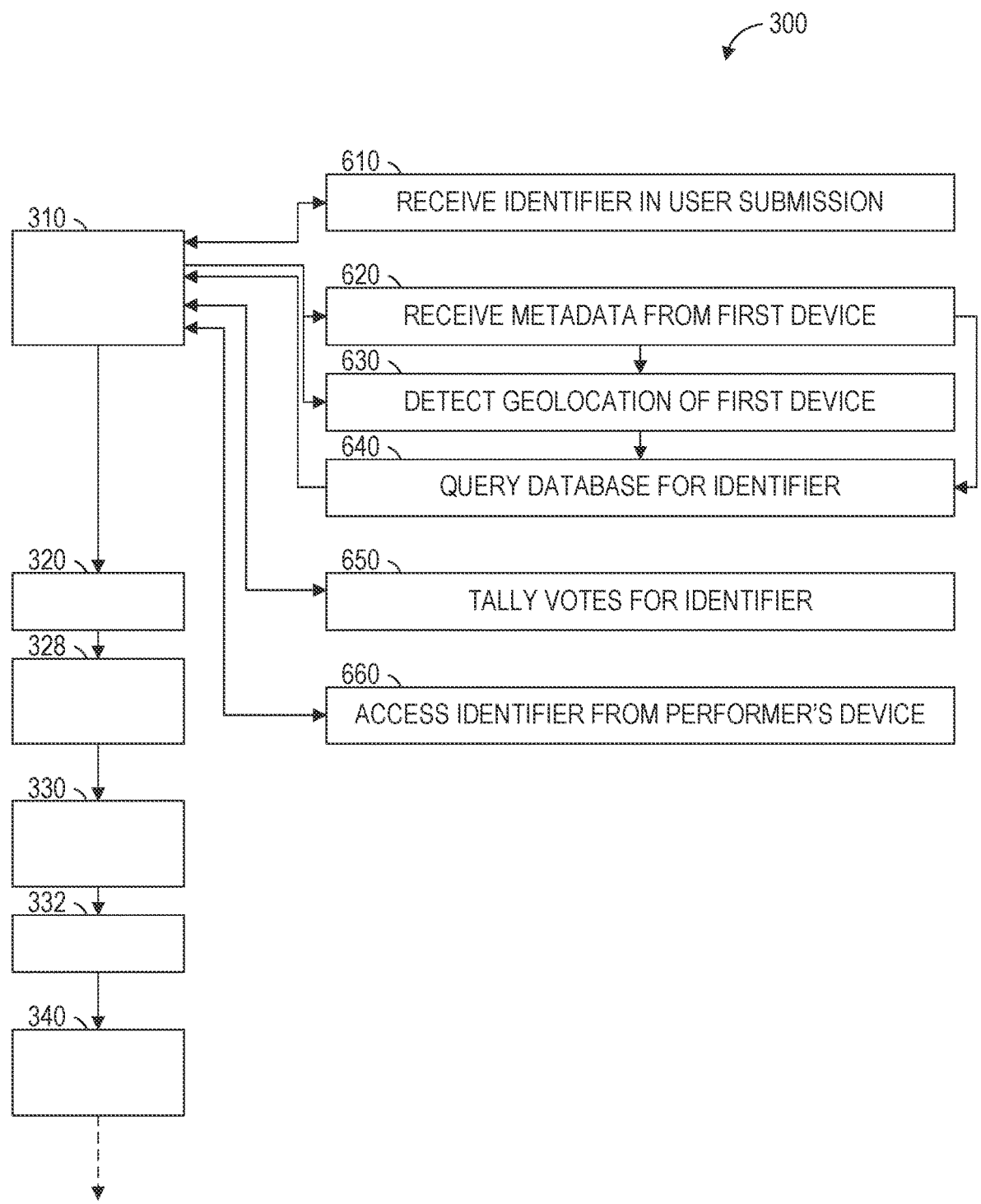

As shown in FIG. 6, the method 300 or portions thereof may include one or more of operations 610, 620, 630, 640, 650, and 660. One or more of operations 610, 620, 630, 640, 650, and 660 may be performed as part (e.g., a precursor task, a subroutine, or a portion) of operation 310, in which the identifier module 210 obtains the identifier of the audio piece. In operation 610, according to some example embodiments, the identifier module 210 receives the identifier in a user submission from the user 122 via the device 120 (e.g., the first device). For example, the user 122 may be a manager, promoter, moderator, or other authoritative person for the event in which the live performance occurs, and the user 122 may submit the identifier to the network-based system 105 (e.g., so that other users 132, 142, and 152 may be able to receive the identifier on their respective devices 130, 140, and 150). In some example embodiments, the identifier is received from the device 160 of the performer 162, the mixer 161, or any suitable combination thereof.

In operation 620, according to certain example embodiments, the identifier module 210 receives some metadata of the audio piece (e.g., without the identifier of the audio piece) from the device 120 (e.g., the first device, as a user submission). Such metadata may include one or more descriptors of the audio piece (e.g., an artist name, an album name, a release year, or a genre). For example, the user 122 may be an audience member that does not know the identifier of the audio piece, but knows at least some metadata of the audio piece (e.g., the artist name, the album name, the release year, the genre, or even a portion of the identifier of the audio piece). In such a situation, the user 122 may submit what he knows to the network-based system 105. This operation may be repeated for additional users (e.g., user 152) to obtain additional metadata of the audio piece. The metadata received in operation 620 (e.g., from one or more users 122 and 152) may be a basis (e.g., a sufficient basis) for the identifier module 210 to obtain the identifier of the audio piece (e.g., from the database 115, which may correlate the metadata with the identifier of the audio piece). In some example embodiments, the metadata is received from the device 160 of the performer 162, the mixer 161, or any suitable combination thereof.

In operation 630, the identifier module 210 detects a geolocation of the device 120 (e.g., the first device). This may be performed based on an indication that the user 122 has made the device 120 available for location-based services (e.g., stored by the database 115 in a user profile for the user 122). The detected geolocation may be a basis (e.g., a sufficient basis) for the identifier module 210 to obtain the identifier of the audio piece (e.g., from the database 115, which may correlate the location of the venue at which the audio piece is being performed with the identifier of the audio piece).

In operation 640, the identifier module 210 queries the database 115 for the identifier of the audio piece. This query may be made based on the metadata of the audio piece received in operation 620 (e.g., one or more descriptors of the audio piece), the geolocation of the device 120 (e.g., the first device) detected in operation 630, or any suitable combination thereof.

In operation 650, the identifier module 210 may have performed multiple instances of operation 610 and received multiple submissions that attempt to submit the identifier of the audio piece (e.g., submissions that include both correct and incorrect identifiers). In situations where the multiple submissions are not unanimous, the identifier module 210 performs operation 650 by tallying votes for the identifier of the audio piece. For example, the identifier module 210 may count the quantity of submissions received for each distinct identifier. In some example embodiments, the identifier with the most votes is selected by the identifier module 210 as the identifier of the audio piece in operation 310. In alternative example embodiments, an identifier with less than the largest number of votes is selected based on results from one or more of operations 620, 630, and 640. In some example embodiments, one or more of the devices 120, 130, 140, and 150 may execute software that implements a game (e.g., a multiplayer quiz or trivia game) that solicits the multiple submissions that attempt to submit the identifier of the audio piece. For example, a game may challenge the users 122, 132, 142, and 152 to win a prize (e.g., an album on CD) by correctly identifying multiple audio pieces performed by the performer 162 or by being the first to correctly identify all songs released on a specific album.

In operation 660, the identifier module 210 accesses the identifier of the audio piece (e.g., directly or indirectly) from the device 160 of the performer 162, the mixer 161, or any suitable combination thereof. For example, in a nightclub environment, the device 160 may be a computer operated by a disc jockey (DJ) and configured to play the audio piece (e.g., execute the performance of the audio piece). As another example, the mixer 161 may be or include a computer that executes audio mixing software (e.g., programmed with a list of song names and start times). The identifier module 210 may thus obtain (e.g., read) the identifier of the audio piece based on a playlist, current date, current time, or any suitable combination thereof. In some example embodiments, the identifier module 220 receives the identifier in response to an event within audio renderer that is executing on the device 160, the mixer 161, or both. Examples of such an event include a play event, a stop event, a pause event, a scratch event, a playback position timer event, or any suitable combination thereof.

Figure 7:
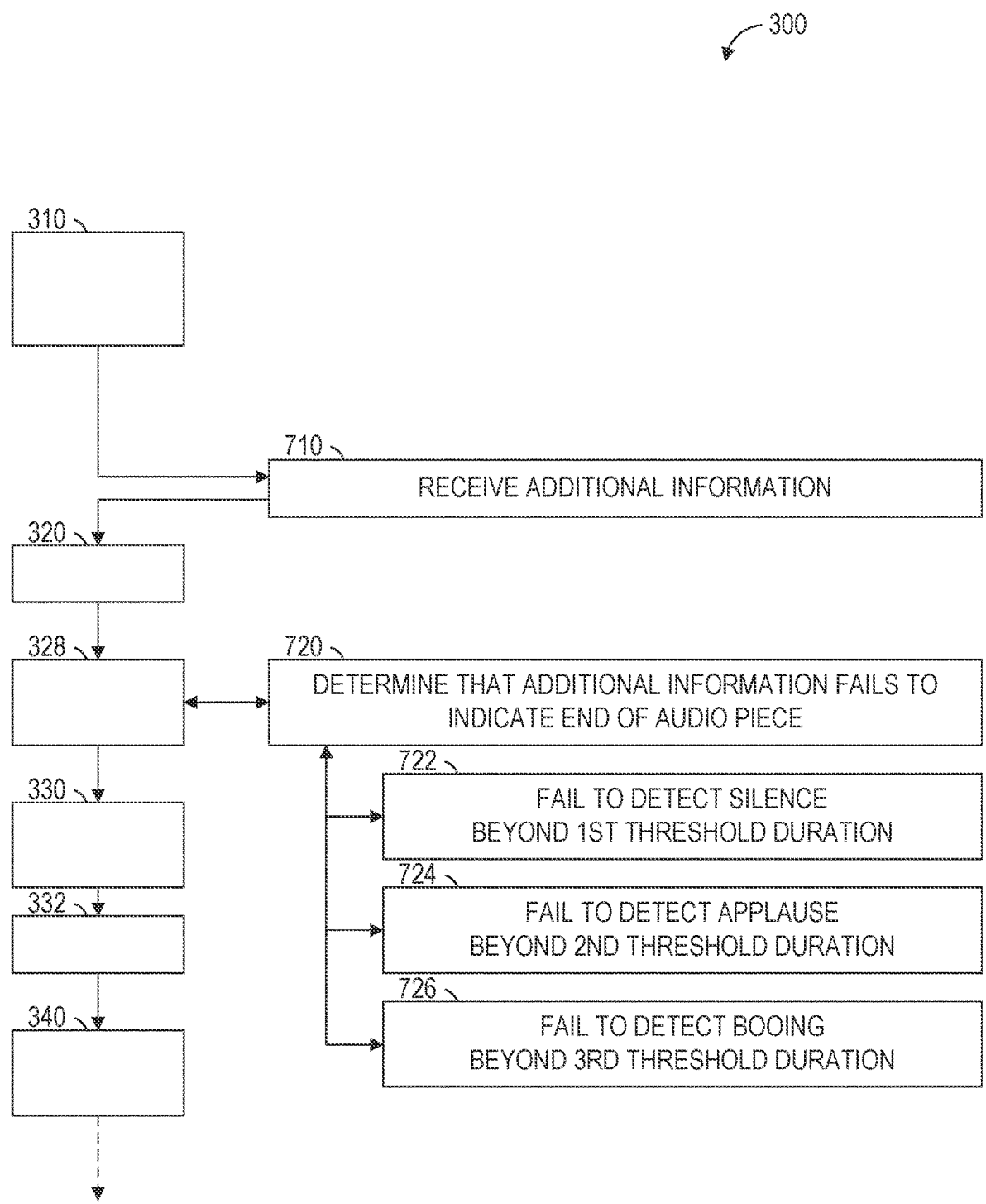

As shown in FIG. 7, the method 300 or portions thereof may include one or more of operations 710, 720, 722, 724, and 726. In particular, example embodiments of the method 300 that include one or more of operations 328 and 428 may include operations 710 and 720. As noted above, operations 328 and 428 involve the determination module 230 of the identification machine 110 determining that the performance of the audio piece is not done. This determination may be made by determining that one or more live fingerprints of segments of the audio piece being performed fail to indicate an end of the audio piece, an end of the performance of the audio piece, or both.

In operation 710, the reception module 220 of the identification machine 110 accesses (e.g., receives) one or more live fingerprints of segments of the audio piece. These live fingerprints may be received from one or more devices (e.g., devices 120, 130, 140, and 150), and these received live fingerprints may be used by the determination module 230 in performing operation 328, operation 420, or both. Accordingly, operation 710 may be performed any number of times between operations 310 and 320 and any number of times between operations 310 and 420.

Operation 720 may be performed as part of operation 328, in which the determination module 230 determines that the performance of the audio piece is not done. In some example embodiments, operation 720 may be performed as part of operation 428, which is similar to operation 328. In operation 720, the determination module 230 determines that the live fingerprints received in operation 710 fail to indicate an end of the audio piece (e.g., that the fingerprints fail to indicate that the performance of the audio piece has ended). One or more of operations 722, 724, and 726 may be performed as part of operation 720.

In operation 722, the determination module 230 fails to detect silence beyond a threshold period of time (e.g., first threshold duration corresponding to a period of silence indicative of an end of a performance). Thus, the determination in operation 720 that the performance is not over may be based on an absence of silence that lasts longer than this threshold period of time.

In operation 724, the determination module 230 fails to detect applause beyond a threshold period of time (e.g., a second threshold duration corresponding to a period of clapping or cheering indicative of an end of the performance). Thus, the determination in operation 720 that the performance is not over may be based on an absence of applause that lasts longer than this threshold period of time.

In operation 726, the determination module 230 fails to detect booing beyond a threshold period of time (e.g., a third threshold duration corresponding to a period of groaning or jeering indicative of an end of the performance). Thus, the determination in operation 720 that the performance is not over may be based on an absence of booing that lasts longer than this threshold period of time.

Figure 8:
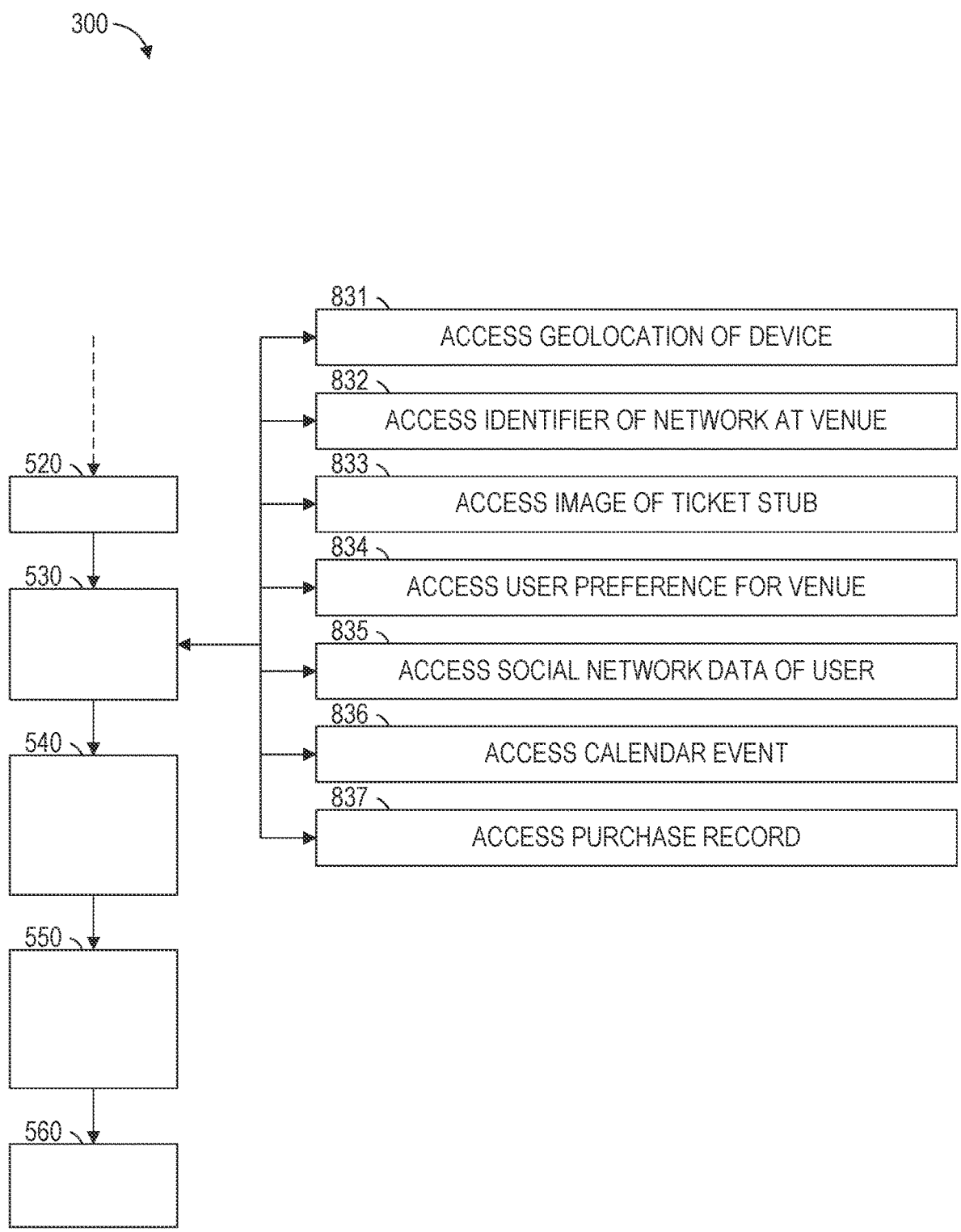

As shown in FIG. 8, the method 300 or portions thereof may include one or more of operations 831, 832, 833, 834, 835, 836, and 837. One or more of operations 831-837 may be performed as part of operation 530, in which the performer module 270 of the identification machine 110 may identify the performer by detecting the venue of the performance of the audio piece (e.g., a live performance of a live version of the audio piece).

In operation 831, the performer module 270 accesses a geolocation (e.g., GPS coordinate) of the device 140 (e.g., the third device) from which the live fingerprint was received in operation 520. In some example embodiments, the geolocation is received with the live fingerprint in operation 520.

In operation 832, the performer module 270 accesses an identifier of a network at the venue (e.g., an IP address or a domain name of the network 190) from the device 140 (e.g., the third device) from which the live fingerprint was received in operation 520. Such a network may be or include a local wireless network at the venue. For example, the identifier may identify the network 190 to which the device 140 is communicatively coupled. In some example embodiments, the identifier of the network 190 is received with the live fingerprint in operation 520.

In operation 833, the performer module 270 accesses an image (e.g., a photo) of a ticket stub for an event that includes the live performance of the audio piece. For example, such an image may be generated (e.g., captured or taken) by a built-in camera within the device 140 (e.g., the third device) from which the live fingerprint was received in operation 520. In some example embodiments, the image of the ticket stub is received with the live fingerprint in operation 520.

In operation 834, the performer module 270 accesses a user preference for the venue (e.g., stored in a user profile of the user 142 within the database 115). For example, the database 115 may store a user profile that indicates the venue is the closest of multiple available venues to a residence of the user 142, who is associated with (e.g., corresponds to) the device 140 (e.g., the third device) from which the live fingerprint was received in operation 520. In some example embodiments, the user preference for the venue is received with the live fingerprint in operation 520.

In operation 835, the performer module 270 accesses social network data of the user 142 (e.g., stored within the database 115 or accessible via the network 190 from a third-party social network server). For example, the database 115 may store social network data descriptive of the user 142 (e.g., status updates, microblog posts, images, comments, likes, favorites, or other public, private, or semiprivate publications to friends of the user 142), and some or all of the social network data may reference the venue or otherwise indicate that the user 142 is located at the venue where the live performance is taking place at the current date and current time. Since the user 142 is associated with (e.g., corresponds to) the device 140 (e.g., the third device) from which the live fingerprint was received in operation 520, the performer module 270 may detect the venue of the live performance based on the social network data of the user 142. In some example embodiments, the social network data is received with the live fingerprint in operation 520.

In operation 836, the performer module 270 accesses a calendar event of the user 142 (e.g., stored within the database 115 or accessible via the network 190 from a third-party calendar server). For example, the database 115 may store calendar data for the user 142 (e.g., meetings, appointments, or other scheduled events), and the accessed calendar event may indicate that the user 142 is located at the venue where the live performance is taking place at the current date and current time. Since the user 142 is associated with (e.g., corresponds to) the device 140 (e.g., the third device) from which the live fingerprint was received in operation 520, the performer module 270 may detect the venue of the live performance based on the calendar event of the user 142. In some example embodiments, the calendar event is received with the live fingerprint in operation 520.

In operation 837, the performer module 270 accesses a purchase record (e.g., transaction record) of the user 142 (e.g., stored within the database 115 or accessible via the network 190 from a third-party transaction server). For example, the database 115 may store purchase data for the user 142 (e.g., transaction records for purchases made by the user 142), and the purchase record may indicate that the user 142 purchased a ticket (e.g., from the venue) for an event at which the live performance is taking place at the current date and current time. Since the user 142 is associated with (e.g., corresponds to) the device 140 (e.g., the third device) from which the live fingerprint was received in operation 520, the performer module 270 may detect the venue of the live performance based on the purchase record of the user 142.

In some example embodiments, the purchase record is received with the live fingerprint in operation 520.

Figure 9:
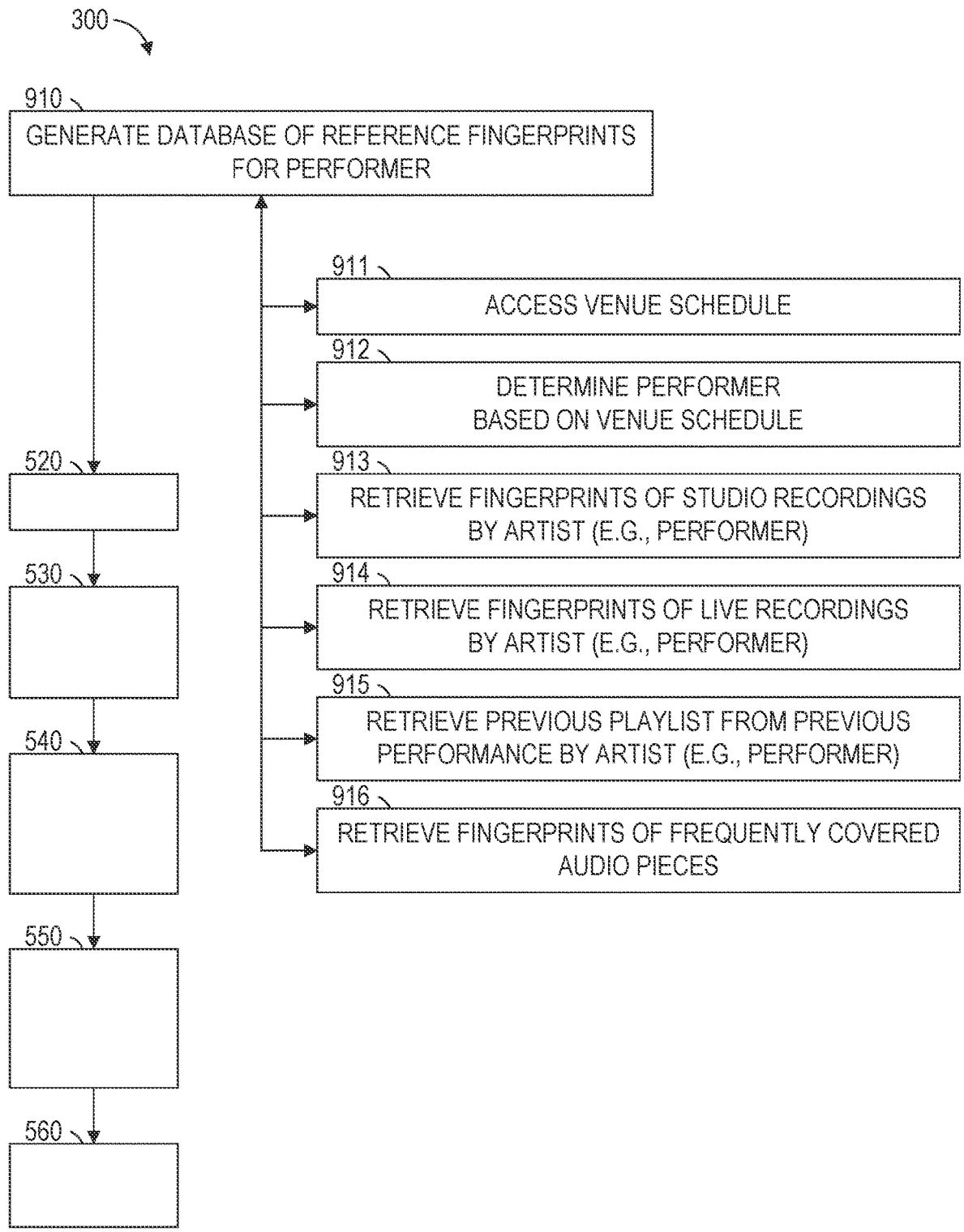

As shown in FIG. 9, the method 300 or portions thereof may include operation 910, which in turn may include one or more of operations 911, 912, 913, 914, 915, and 916. According to various example embodiments, operation 910 may be performed at any point prior to operation 540, in which the reference module 280 of the identification machine 110 accesses the reference fingerprints. For example, operation 910 may be performed prior to the beginning of the performance itself. In some example embodiments, operation 910 is performed each time the performer 160 or an artist that originally recorded the audio piece releases new material (e.g., new recordings of audio pieces). In certain example embodiments, operation 910 is performed periodically (e.g., at regularly scheduled intervals of time).

In operation 910, the reference module 280 of the identification machine 110 builds the set of reference fingerprints to be accessed in operation 540. The reference module 280 may do this by generating some or all of the database 115. One or more of operations 911-960 may be performed as part of operation 910.

In operation 911, the reference module 280 accesses a schedule for a venue at which an event that includes the live performance will be take place. For example, the reference module 280 may access a venue schedule in the form of an event calendar (e.g., a concert calendar) for the venue, a playlist for the venue, an agenda for the venue, an advertisement (e.g., poster) for the venue, or any suitable combination thereof. The schedule may be accessed from information previously collected and stored in the database 115 or from a third-party server corresponding to the venue itself. According to various example embodiments, the accessed schedule may correlate the venue with the performer 162 of the audio piece, correlate the venue with an artist that recorded a reference version of the audio piece (e.g., an original artist that recorded a studio recording of the audio piece or a live recording of the audio piece), correlate the venue with a period of time during which the live fingerprint is received in operation 520, or any suitable combination thereof.

In operation 912, the reference module 280 determines (e.g., identifies) the performer 162 based on the schedule accessed in operation 911. For example, the performer 162 may be determined based on the artist being correlated with the venue by the schedule accessed in operation 911. As another example, the performer 162 may be determined based on the period of time during which the live fingerprint is received in operation 520 being correlated with the artist by the schedule. This determination of the performer 162 may enable the identification machine 110 to infer the likely audio pieces to be played and thus significantly reduce the number of possible audio pieces that may be performed during the live performance.

In operation 913, the reference module 280 accesses (e.g., retrieves) studio reference fingerprints of segments of studio recordings by an artist (e.g., original artist). In some example embodiments, the artist is the performer 162, though this need not be the case. The studio reference fingerprints may be accessed from information previously collected and stored in the database 115 or from a third-party server (e.g., corresponding to the venue, to the artist, to the performer 162, or any suitable combination thereof).

In operation 914, the reference module 280 accesses (e.g., retrieves) live reference fingerprints of segments of studio recordings by the artist (e.g., original artist). As noted above, the artist may be the performer 162, though this need not be the case. The live reference fingerprints may be accessed from information previously collected and stored in the database 115 or from a third-party server (e.g., corresponding to the venue, to the artist, to the performer 162, or any suitable combination thereof). In some example embodiments where the performer 162 is the artist, the mixer 161 is the source of one or more segments of a reference version of the audio piece whose live version is being performed, and one or more of the live reference fingerprints are generated (e.g., by the reference module 280) from such segments received from the mixer 161. In addition, the mixer 161, the device 160 of the performer 162, or both, may provide the reference module 280 with metadata (e.g., at least some of the metadata accessed in operation 332) that describes or identifies the audio piece, one or more live recordings of the audio piece, one or more studio recordings of the audio piece, or any suitable combination thereof (e.g., for storage in the database 115 and for access by the query module 250).

In operation 915, the reference module 280 accesses (e.g., retrieves) a previously played playlist from a previously performed performance by the same artist (e.g., the performer 162). This may enable the identification machine 110 to further infer the most likely audio pieces to be played and thus even further reduce the number possible audio pieces that may be performed during a live performance. According to some example embodiments, the previously played playlist may be a basis for weighting one or more of multiple candidate identifiers of the audio piece. Similarly, identifiers of audio pieces already performed during the current performance may be accorded lower weights or omitted from consideration, since it may be unlikely that the performer 162 will perform the same audio piece twice in one show, particularly, back-to-back or within a short time window (e.g., 20 minutes).

In operation 916, the reference module 280 accesses (e.g., retrieves) fingerprints for segments of likely or most likely audio pieces to be played by the performer 162. These accessed fingerprints may then be designated by the reference module 280 as the set of reference fingerprints to be accessed in operation 540. As noted above, these accessed fingerprints may be stored in the database 115, for later use (e.g., in operation 540).

According to various example embodiments, one or more of the methodologies described herein may facilitate identification of an audio piece during its performance. Moreover, one or more of the methodologies described herein may facilitate identification of the audio piece during performance of a live version of the audio piece, even where the live version differs from previously recorded versions of the audio piece. Hence, one or more the methodologies described herein may facilitate retrieval and presentation of information regarding the identified audio piece (e.g., its identifier and some or all of its metadata) to one or more audience members during performance of the same audio piece. Furthermore, one or more of the methodologies described herein may facilitate identification and tagging of recordings that were made during the performance.

When these effects are considered in aggregate, one or more of the methodologies described herein may obviate a need for certain efforts or resources that otherwise would be involved in identifying an audio piece during the performance of an audio piece. Efforts expended by a user may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 10:
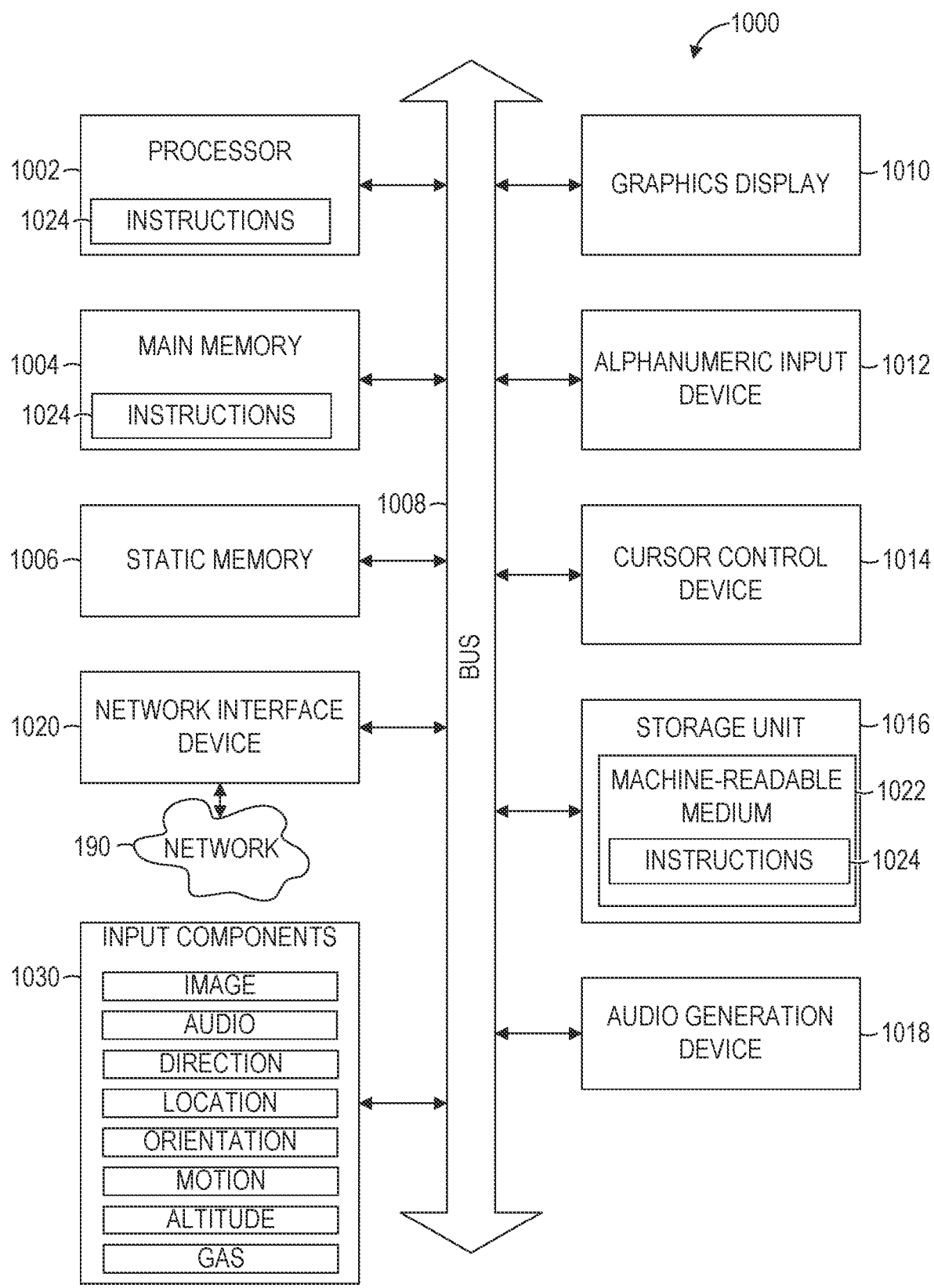
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part.

In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include any collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a cursor control device 1014 (e.g., a mouse, a touchpad, a trackball, a joystick, a motion sensor, an eye tracking device, or other pointing instrument), a storage unit 1016, an audio generation device 1018 (e.g., a sound card, an amplifier, a speaker, a headphone jack, or any suitable combination thereof), and a network interface device 1020.

The storage unit 1016 includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the processor 1002 (e.g., within the processor's cache memory), or both, before or during execution thereof by the machine 1000. Accordingly, the main memory 1004 and the processor 1002 may be considered machine-readable media (e.g., tangible and non-transitory machine-readable media). The instructions 1024 may be transmitted or received over the network 190 via the network interface device 1020. For example, the network interface device 1020 may communicate the instructions 1024 using any one or more transfer protocols (e.g., hypertext transfer protocol (HTTP)).

In some example embodiments, the machine 1000 may be a portable computing device, such as a smart phone or tablet computer, and have one or more additional input components 1030 (e.g., sensors or gauges). Examples of such input components 1030 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. An apparatus to identify audio, the apparatus comprising:

at least one memory; and at least one processor to at least:

transform a segment of audio into a log-frequency spectrogram based on a constant Q transform using a logarithmic frequency resolution;

transform the log-frequency spectrogram into a binary image, each pixel of the binary image corresponding to a time frame and frequency channel pair, each frequency channel representing a corresponding quarter tone frequency channel in a range from musical note C3 to musical note C8;

generate a matrix product of the binary image and a plurality of reference fingerprints;

normalize, based on a number of frequency ranges represented in the binary image, the matrix product to form a similarity matrix;

select an alignment of a line in the similarity matrix that intersects one or more bins in the similarity matrix with the largest calculated Hamming similarities; and select a reference fingerprint based on the alignment.

2. The apparatus of claim 1, wherein the processor selects the alignment without using a hash function.

3. The apparatus of claim 1, wherein the line has an angle within a range of forty to fifty degrees in the similarity matrix.

4. The apparatus of claim 3, wherein the angle of the line represents a tempo deviation between the segment of audio and the audio represented by the corresponding reference fingerprints.

5. The apparatus of claim 1, wherein to compute the matrix product, the processor introduces one or more pitch shifts to the binary image.

6. The apparatus of claim 5, wherein the one or more pitch shifts correspond to key variations in a range of negative five semitones to positive five semitones.

7. The apparatus of claim 1, wherein the processor selects the alignment using a Hough Transform.

8. The apparatus of claim 1, wherein to the processor computes the matrix product using a Hamming similarity.

9. The apparatus of claim 1, wherein the processor binarizes the similarity matrix based on a threshold value.

10. An apparatus to identify audio, the apparatus comprising:

means for transforming a segment of audio into a log-frequency spectrogram based on a constant Q transform using a logarithmic frequency resolution, the means for transforming to transform the log-frequency spectrogram into a binary image, each pixel of the binary image corresponding to a time frame and frequency channel pair, each frequency channel representing a corresponding quarter tone frequency channel in a range from musical note C3 to musical note C8;

means for generating a matrix product of the binary image and a plurality of reference fingerprints;

means for normalizing, based on a number of frequency ranges represented in the binary image, the matrix product to form a similarity matrix; and means for selecting an alignment of a line in the similarity matrix that intersects one or more bins in the similarity matrix with the largest calculated Hamming similarities, the means for selecting to select a reference fingerprint based on the alignment.

11. The apparatus of claim 10, wherein the means for selecting comprises selecting the alignment without using a hash function.

12. The apparatus of claim 10, wherein the line has an angle within a range of forty to fifty degrees in the similarity matrix.

13. The apparatus of claim 12, wherein the angle of the line represents a tempo deviation between the segment of audio and the audio represented by the corresponding reference fingerprints.

14. The apparatus of claim 10, wherein the means for generating comprises introducing one or more pitch shifts to the binary image.

15. The apparatus of claim 14, wherein the one or more pitch shifts correspond to key variations in a range of negative five semitones to positive five semitones.

16. The apparatus of claim 10, wherein the means for selecting comprises selecting the alignment using a Hough Transform.

17. The apparatus of claim 10, wherein the means for generating comprises generating the matrix product using a Hamming similarity.

18. The apparatus of claim 10, further including means for binarizing the similarity matrix based on a threshold value.

* * * * *